United States Patent
Athas et al.

(10) Patent No.: US 8,541,999 B2
(45) Date of Patent: Sep. 24, 2013

(54) CONTROLLING POWER LOSS IN A SWITCHED-CAPACITOR POWER CONVERTER

(75) Inventors: William C. Athas, San Jose, CA (US); Thomas C. Greening, San Jose, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 12/783,728

(22) Filed: May 20, 2010

(65) Prior Publication Data

US 2011/0031957 A1    Feb. 10, 2011

Related U.S. Application Data (63) Continuation-in-part of application No. 12/629,370, filed on Dec. 2, 2009, now Pat. No. 8,085,103, which is a continuation-in-part of application No. 12/540,578, filed on Aug. 13, 2009, now Pat. No. 7,982,548, which is a continuation-in-part of application No. 12/535,974, filed on Aug. 5, 2009, now Pat. No. 8,320,141.

(51) Int. Cl.
  *G05F 1/00* (2006.01)
  *H02M 3/18* (2006.01)
(52) U.S. Cl.
  USPC .................. 323/288; 323/290; 307/110
(58) Field of Classification Search
  USPC .......... 323/242, 288, 290; 363/21.02, 21.03, 363/59–61; 307/110
  See application file for complete search history.

(56) References Cited

U.S. PATENT DOCUMENTS

| | | | |
|---|---|---|---|
| 4,807,104 A * | 2/1989 | Floyd et al. | ..... 363/59 |
| 5,051,881 A | 9/1991 | Herold | |
| 5,396,195 A | 3/1995 | Gabara | |
| 5,559,478 A | 9/1996 | Athas | |

(Continued)

FOREIGN PATENT DOCUMENTS

| GB | 2374952 A | 10/2002 |
|---|---|---|
| JP | 2003218634 A | 7/2003 |

(Continued)

OTHER PUBLICATIONS

Athas, W.C. et al., "A Resonant Signal Driver for Two-Phase, Almost-Non-Overlapping Clocks", pp. 129-132, 1996.

(Continued)

*Primary Examiner* — Adolf Berhane
*Assistant Examiner* — Gary Nash
(74) *Attorney, Agent, or Firm* — Park, Vaughan, Fleming & Dowler, LLP (57) ABSTRACT

The disclosed embodiments relate to a system that implements a switched-capacitor power converter which is configured to actively control power loss while converting an input voltage to an output voltage. This system includes one or more switched-capacitor blocks (SCBs), wherein each SCB includes a first capacitor and a set of switching devices configured to couple a constant-potential terminal and a time-varying-potential terminal of the first capacitor between the input voltage, the output voltage and a reference voltage. The system also includes a clocking circuit which produces gate drive signals for switching transistors in the one or more SCBs. The system additionally includes a controller configured to actively control the gate drive signals from the clocking circuit to substantially minimize the power loss for the switched-capacitor power converter.

16 Claims, 8 Drawing Sheets

(56) References Cited

U.S. PATENT DOCUMENTS

| | | | |
|---|---|---|---|
| 5,677,077 A | 10/1997 | Faulk | |
| 5,684,682 A | 11/1997 | Zhong | |
| 5,760,637 A | 6/1998 | Wong | |
| 6,064,277 A | 5/2000 | Gilbert | |
| 6,169,673 B1 | 1/2001 | McIntyre | |
| 6,188,590 B1 | 2/2001 | Chang | |
| 6,249,192 B1 | 6/2001 | Gabara | |
| 6,559,492 B1* | 5/2003 | Hazucha et al. | 257/299 |
| 6,559,689 B1* | 5/2003 | Clark | 327/97 |
| 6,573,695 B2* | 6/2003 | Shashoua | 323/282 |
| 6,650,163 B1* | 11/2003 | Burns et al. | 327/295 |
| 6,650,555 B2 | 11/2003 | Suzuki | |
| 6,738,271 B2 | 5/2004 | Umeda | |
| 6,744,224 B2* | 6/2004 | Ishii | 315/291 |
| 7,430,133 B1* | 9/2008 | McIntyre et al. | 363/60 |
| 7,737,767 B2* | 6/2010 | Oyama et al. | 327/536 |
| 2002/0041503 A1 | 4/2002 | Roohparvar | |
| 2004/0196095 A1 | 10/2004 | Nonaka | |
| 2006/0197583 A1 | 9/2006 | Yen | |
| 2006/0290388 A1 | 12/2006 | Tolle | |
| 2009/0167418 A1 | 7/2009 | Raghavan | |
| 2009/0309566 A1* | 12/2009 | Shiu | 323/283 |
| 2011/0032043 A1 | 2/2011 | Athas | |

FOREIGN PATENT DOCUMENTS

| | | |
|---|---|---|
| WO | 02061930 A1 | 8/2002 |
| WO | 2006078244 A1 | 7/2006 |
| WO | 2009136369 A2 | 5/2008 |

OTHER PUBLICATIONS

Lenoir, Eric "Getting the Most out of Ceramic Capacitors", pp. 1-6, Aug. 1, 2003.

* cited by examiner

CONTROLLING POWER LOSS IN A SWITCHED-CAPACITOR POWER CONVERTER

RELATED APPLICATIONS

This application is a continuation-in-part of a pending parent application, U.S. patent application Ser. No. 12/629,370, entitled "Resonant Oscillator with Reduced Startup Transients," filed on 2 Dec. 2009 by inventor William C. Athas. This parent application is a continuation-in-part of a pending grandparent application, U.S. patent application Ser. No. 12/540,578, entitled "Resonant Oscillator with Oscillation-Startup Circuitry," filed on 13 Aug. 2009 by inventor William C. Athas. This grandparent application is a continuation-in-part of a pending great-grandparent application, U.S. patent application Ser. No. 12/535,974, entitled "High-Efficiency Switched-Capacitor Power Conversion," filed on 5 Aug. 2009 by inventors William C. Athas and P. Jeffrey Ungar. The present application hereby claims priority under 35 U.S.C. §120 and 35 U.S.C. §121 to the above-listed applications.

BACKGROUND

1. Field

The disclosed embodiments generally relate to techniques for converting DC power to different voltages. More specifically, the disclosed embodiments relate to a technique for actively controlling power loss in a switched-capacitor power converter.

2. Related Art

A high-efficiency switched-capacitor power converter is comprised of one or more switched-capacitor blocks (SCBs), which are driven by a resonant clocking circuit to generate an output voltage $V_{HI}$ which is nearly double an input voltage $V_{LO}$. To operate at the highest possible efficiency, a switched-capacitor power converter needs to minimize power losses during the voltage-conversion process. These power losses include both (1) conduction losses in the SCBs and (2) switching losses in the SCBs and resonant clocking circuit.

Fortunately, these losses can be controlled by varying a gate drive voltage $V_G$ generated by the resonant clocking circuit to drive switching transistors in the SCBs. More specifically, increasing $V_G$ increases switching losses and at the same time decreases conduction losses. Conversely, decreasing $V_G$ increases conduction losses and decreases switching losses. Hence, $V_G$ can be adjusted to achieve a balance between switching losses and conduction losses that minimizes power loss in the power converter.

Unfortunately, the relative magnitudes of the conduction losses and switching losses vary as the operating point of the power converter changes over time. More specifically, the relative magnitudes of the conduction losses and switching losses can vary with changes in the root-mean-square output current $I_{RMS}$ and the input voltage $V_{LO}$. As a consequence, the value of $V_G$ that minimizes power loss varies as the operating point of the power converter changes.

Hence, what is needed is a method and an apparatus for controlling power loss in a switched-capacitor power converter in a manner that accounts for changes in the operating point of the power converter.

SUMMARY

The disclosed embodiments relate to a system that implements a switched-capacitor power converter which is configured to actively control power loss while converting an input voltage to an output voltage. This system includes one or more switched-capacitor blocks (SCBs), wherein each SCB includes a first capacitor and a set of switching devices configured to couple a constant-potential terminal and a time-varying-potential terminal of the first capacitor between the input voltage, the output voltage and a reference voltage. The system also includes a clocking circuit which produces gate drive signals for switching transistors in the one or more SCBs. The system additionally includes a controller configured to actively control the gate drive signals from the clocking circuit to substantially minimize the power loss for the switched-capacitor power converter.

In some embodiments, the controller is configured to actively control the gate drive signals by controlling a voltage of the gate drive signals, wherein increasing the voltage of the gate drive signals decreases conduction losses in the one or more SCBs but increases switching losses in the clocking circuit, and, conversely, decreasing the voltage of the gate drive signals decreases switching losses in the clocking circuit but increases conduction losses in the one or more SCBs.

In some embodiments, the controller is configured to actively control the gate drive signals by controlling a frequency of the gate drive signals, wherein increasing the frequency of the gate drive signals decreases conduction losses in the one or more SCBs but increases switching losses in the one or more SCBs and the clocking circuit, and, conversely, decreasing the frequency of the gate drive signals decreases switching losses in the one or more SCBs and the clocking circuit but increases conduction losses in the one or more SCBs.

In some embodiments, controlling the frequency of the gate drive signals involves using one or more tapped inductors in the clocking circuit to control the frequency of the clocking circuit.

In some embodiments, the controller is configured to actively control the gate drive signals by controlling how many SCBs the gate drive signals are driving, wherein increasing the number of SCBs decreases conduction losses in the SCBs but increases switching losses in the one or more SCBs and the clocking circuit, and, conversely, decreasing the number of SCBs decreases switching losses in the one or more SCBs and the clocking circuit but increases conduction losses in the SCBs.

In some embodiments, controlling the voltage of the gate drive signals involves: determining a voltage for the gate drive signals as a function of an input voltage and an output current for the switched-capacitor power converter, wherein the function uses predetermined parameters; and then using the determined voltage to produce the gate drive signals.

In some embodiments, controlling the voltage of the gate drive signals involves: measuring a power loss for the switched-capacitor power converter; and using the measured power loss as an input to a control system which controls the voltage of the gate drive signals to substantially minimize the power loss for the switched-capacitor power converter.

In some embodiments, the control system uses a proportional-integral-derivative (PID) control technique to control the voltage of the gate drive signals.

In some embodiments, the system controls the voltage of the gate drive signals by first performing power measurements to produce one or more measured components of the power loss. Next, the system uses a parameterization model to calculate one or more parameterized components of the power loss based on one or more measured inputs and one or more parameters. The system then estimates the power loss for the switched-capacitor power converter based on the measured components and the parameterized components.

Finally, the system uses the estimated power loss as an input to a control system which controls the voltage of the gate drive signals to substantially minimize the power loss for the switched-capacitor power converter.

In some embodiments, the clocking circuit is a resonant oscillator circuit which includes at least one inductance and at least one capacitance.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Voltage Converter

Figure 1:
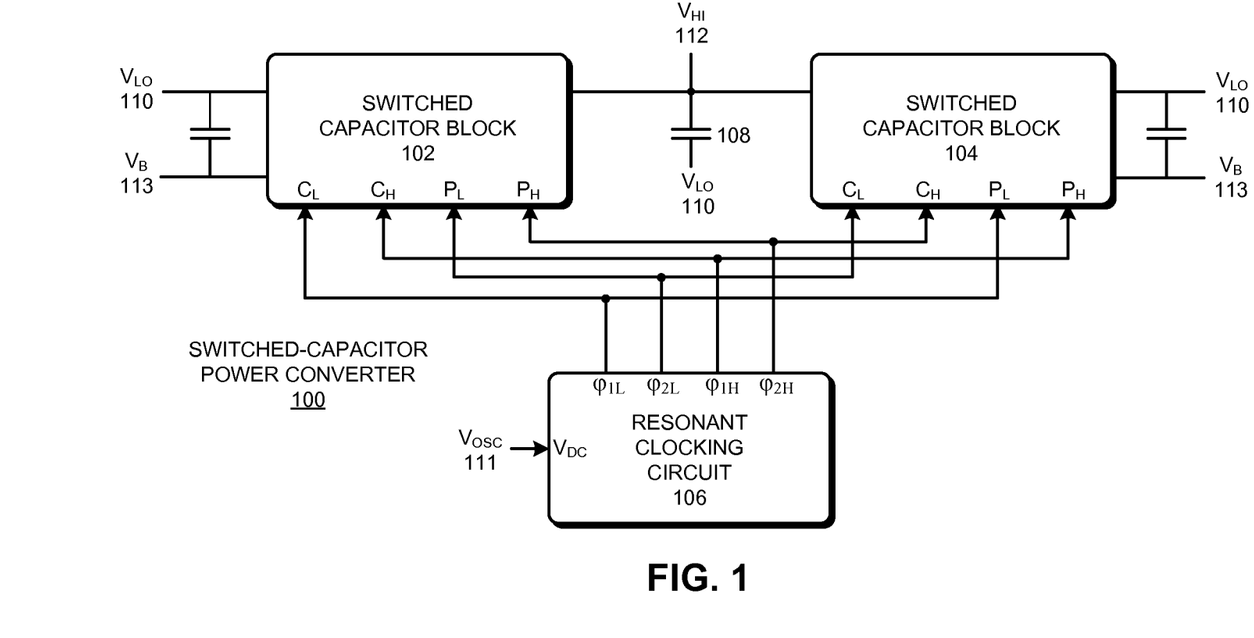
FIG. 1 illustrates a voltage converter in accordance with an embodiment of the present invention.

FIG. 1 illustrates a high-efficiency switched-capacitor power converter 100 in accordance with an embodiment of the present invention. In the illustrated embodiment, a resonant clocking circuit 106 receives an oscillator supply voltage, $V_{OSC}$, from an oscillator voltage source and produces four versions of the two-phase clock, namely $C_L$, $C_H$, $P_L$ and $P_H$. These two-phase clock signals control two switched-capacitor blocks (SCBs) 102 and 104 that drive the output, $V_{HI}$, during opposite clock phases. During forward operation, SCBs 102 and 104 convert a lower input voltage $V_{LO}$ 110 to a higher output voltage $V_{HI}$ 112, which asymptotically equals $2V_{LO}-V_B$. More specifically, during a first clock phase, SCB 102 provides an output voltage $V_{HI}$ 112 which equals $2V_{LO}-IR_{O1}-V_B$ (where $R_{O1}$ is the effective resistance of SCB 102 and I is the output current), while SCB 104 is decoupled from $V_{HI}$ 112. Similarly, during a second clock phase, SCB 104 provides an output voltage $V_{HI}$ 112 which equals $2V_{LO}-IR_{O2}-V_B$ (where $R_{O2}$ is the effective resistance of SCB 104 and I is the output current), while SCB 102 is decoupled from $V_{HI}$ 112. Note that one purpose of the output capacitor 108 is to supply energy to the output when neither SCB drives the output.

Switched-Capacitor Block

Figure 2A:
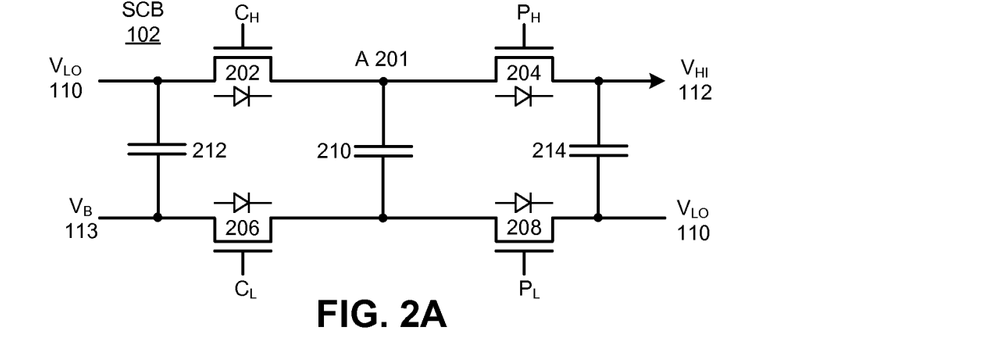
FIG. 2A illustrates the structure of a switched-capacitor block (SCB) in accordance with an embodiment of the present invention.

FIG. 2 illustrates the structure of a switched-capacitor block (SCB) 102 in accordance with an embodiment of the present invention. SCB 102 includes a capacitor 210 (also referred to as a "pump capacitor") and a set of switching devices 202, 204, 206 and 208. In the illustrated embodiment, switching devices 202, 204, 206 and 208 are power metal-oxide-semiconductor field-effect transistors (MOSFETs). Note that FIG. 2 also depicts the directionality of the body diodes for each of the MOSFETs 202, 204, 206 and 208.

FIG. 2 additionally illustrates the connections for MOSFETs 202, 204, 206 and 208. More specifically, MOSFET 202 couples the constant-potential terminal of capacitor 210 to $V_{LO}$ 110 under control of clock input $C_H$; MOSFET 206 couples the time-varying-potential terminal of capacitor 210 to the base voltage, $V_B$ 113 under control of clock input $C_L$; MOSFET 204 couples the constant-potential terminal of capacitor 210 to $V_{HI}$ 112 under control of clock input $P_H$; and MOSFET 208 couples the time-varying-potential terminal of capacitor 210 to $V_{LO}$ 110 under control of clock input $P_L$.

During the first clock phase, the constant-potential terminal of capacitor 210 is coupled to $V_{LO}$ 110, and the time-varying-potential terminal of capacitor 210 is coupled to $V_B$ 113. This allows the voltage across capacitor 210 to be charged up to $V_{LO}-V_B$. During the second clock phase, the constant-potential terminal of capacitor 210 is coupled to $V_{HI}$ 112, and the time-varying-potential terminal of capacitor 210 is coupled to $V_{LO}$ 110. In this way, the voltage across capacitor 210 is stacked on top of $V_{LO}$ 110 to produce output voltage $V_{HI}112=2V_{LO}-V_B-I_OR_O$, wherein $I_O$ is the output current.

In one embodiment of the present invention, capacitor 210 is implemented using a bank of parallel capacitors, wherein each capacitor is a 100 µF ceramic type capacitor. The time-varying-potential terminal of the capacitor bank swings between $V_B$ and $V_{LO}$. Hence, the gate drive for MOSFET 208, which couples the time-varying-potential terminal of the capacitor bank to $V_{LO}$, must have a voltage swing of at least $V_G+V_{LO}$, wherein $V_G$ is the gate drive voltage required for $R_{ds}(on)$ to reach its minimal on resistance. Likewise, the constant-potential terminal of capacitor 210 swings between $V_{LO}$ and $V_{HI}$. Hence, it is not necessary for MOSFETs 202 and 204, which are connected to the constant-potential terminal of the capacitor bank, to swing below $V_{LO}$. These gate drive signals can be biased by the input voltage to swing between $V_{LO}+V_B+V_G$ and $V_{HI}+V_B+V_G$. Note that the energy required to drive each gate is proportional to $(V_{LO}+V_G)^2$.

Figure 2B:
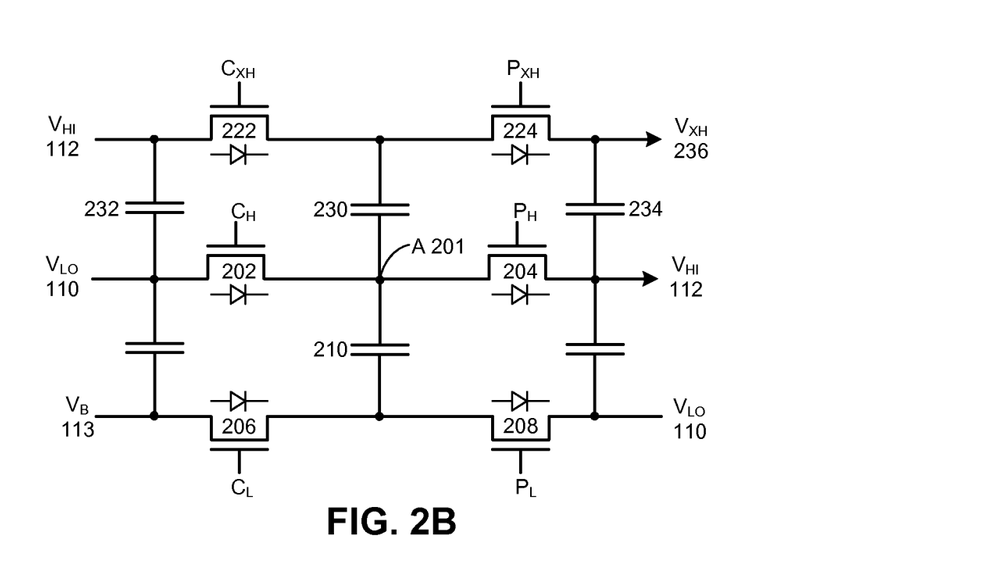
FIG. 2B illustrates the structure of a cascadable SCB in accordance with an embodiment of the present invention.

FIG. 2B illustrates how a voltage higher than $V_{HI}$ may be obtained with the addition of two switching devices and three capacitors. More specifically, FIG. 2B contains all of the circuitry illustrated in FIG. 2 and additionally contains two transistors 222 and 224 and three capacitors 230, 232 and 234. Note that the lower terminal of capacitor 230 attaches to node A 201. During system operation, node A 201 swings from $V_{LO}$ to $V_{HI}$. Transistor 222 is turned on when node A 201 is at $V_{LO}$, which causes capacitor 230 to charge up to $V_{HI}-V_{LO}$. Next, transistor 224 is turned on when node A 201 reaches $V_{HI}$. This causes the output voltage $V_{XH}$ 236 to reach $V_{HI}+V_{LO}$. In this way the circuit illustrated in FIG. 2B effectively acts as a voltage tripler. To one skilled in the art, a quadrupler, etc., may be constructed by again applying the transformation from FIG. 2A to FIG. 2B. Note that, because the circuitry illustrated in FIG. 2B is reversible, one can consider any of the points above $V_B$ to be the input, and the rest will be outputs. For example, if $V_{LO}$ is the input and $V_B$ is ground, $V_{HI}$ provides a 2× output and $V_{XH}$ 236 provides a 3× output. Alternatively, if $V_{HI}$ is the input, $V_L$ provides a ½× output and $V_{XH}$ provides a 3/2× output. Similarly, if $V_{XH}$ is the input, $V_{HI}$ provides a 2/3× output and $V_{LO}$ provides a 1/3× output.

Voltage-Conversion Process

Figure 3:
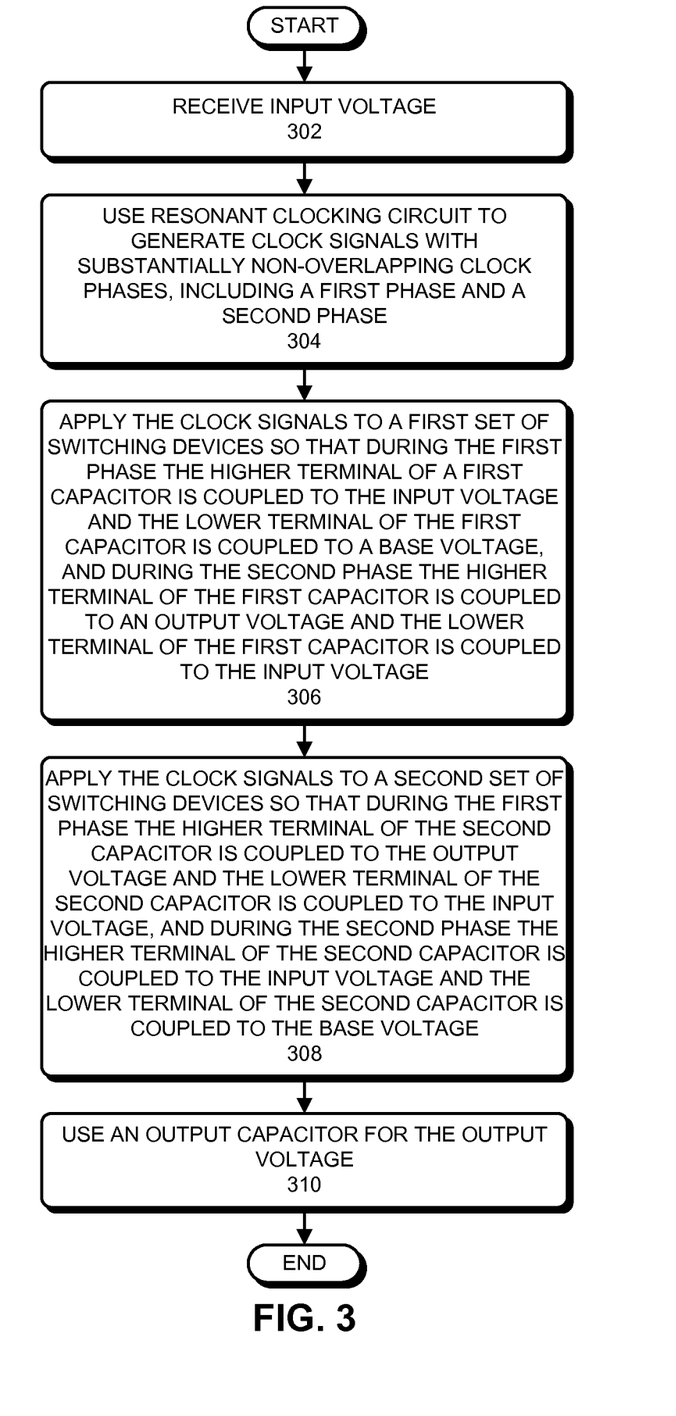
FIG. 3 presents a flowchart illustrating the voltage-conversion process in accordance with an embodiment of the present invention.

FIG. 3 presents a flowchart illustrating the voltage-conversion process in accordance with an embodiment of the present invention. This flow chart covers the operation of the system illustrated in FIG. 1. During operation, the system receives an input voltage $V_{LO}$ (step 302). Next, the system uses a resonant clocking circuit to generate clock signals with substantially non-overlapping clock phases, including a first phase and a second phase (step 304).

These clock signals are applied to a first set of switching devices (inside SCB 102), so that during the first phase the constant-potential terminal of a first capacitor is coupled to the input voltage and the time-varying-potential terminal of the first capacitor is coupled to the base voltage, and during the second phase the constant-potential terminal of the first capacitor is coupled to the output voltage and the time-varying-potential terminal of the first capacitor is coupled to the input voltage (step 306).

These clock signals are also applied to a second set of switching devices (inside SCB 104), so that during the first phase the constant-potential terminal of the second capacitor is coupled to the output voltage and the time-varying-potential terminal of the second capacitor is coupled to the input voltage, and during the second phase the terminal of the second capacitor is coupled to the input voltage and the time-varying-potential terminal of the second capacitor is coupled to ground (step 308). Finally, an output capacitor 108 is used to perform a number of functions, including filtering the output voltage (step 310).

Resonant Clocking Circuit

Figure 4:
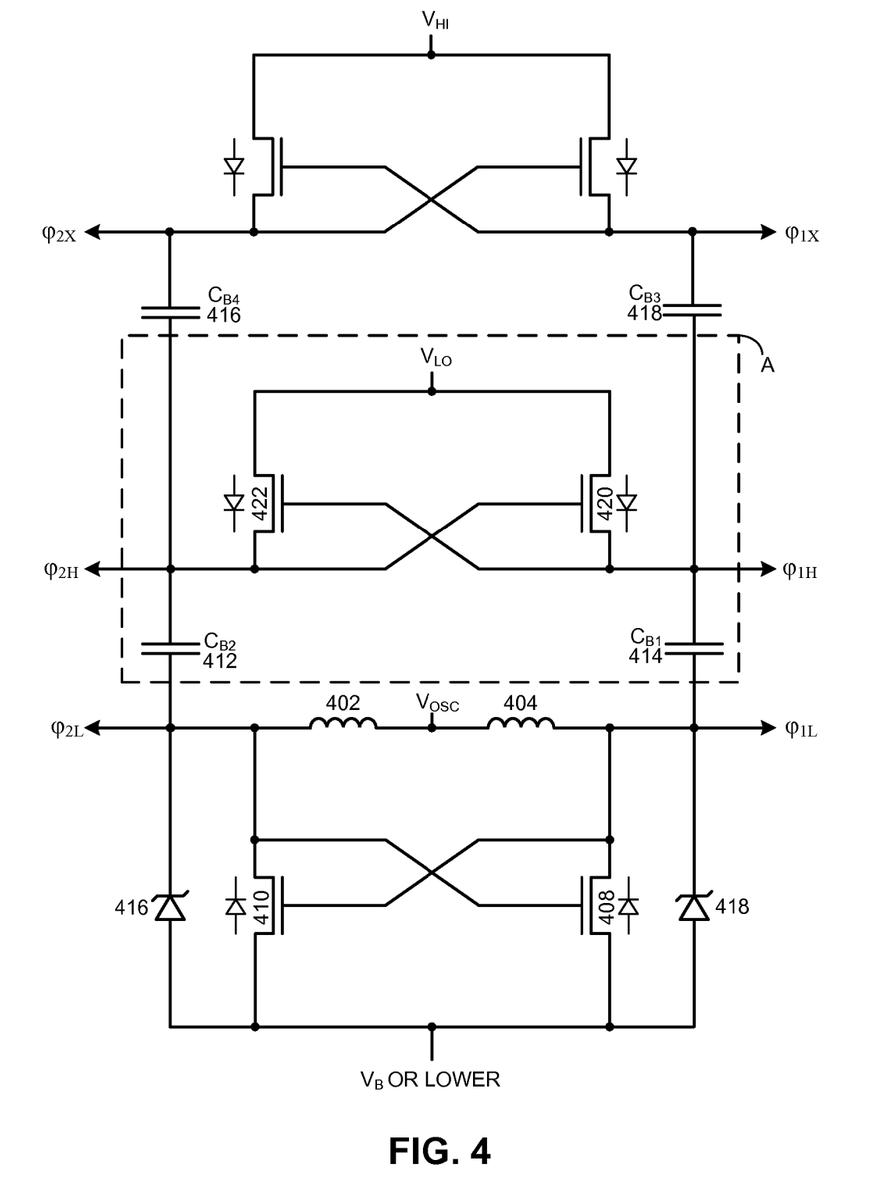
FIG. 4 illustrates a resonant-clocking circuit in accordance with an embodiment of the present invention.

FIG. 4 illustrates a resonant clocking circuit in accordance with an embodiment of the present invention. Referring to the bottom portion of FIG. 4, the basic resonant clocking circuit includes two complementary circuit sections that produce opposing clock phases. The first circuit section includes inductor 402 and FET 410 and produces output $\phi_{2L}$. The second complementary circuit section includes inductor 404 and FET 408 and produces output $\phi_{1L}$, wherein $\phi_{1L}$ and $\phi_{2L}$ provide opposing clock phases. Note that FETs 408 and 410 are cross-coupled so that the control input for each of FETs 408 and 410 is taken from the output from the complementary circuit section. Also note that the gate capacitance for each FET is lumped in with the output-load capacitance for the opposing clock phase. (Also note that the load capacitance is the gate capacitance at the SCB.)

During operation of this resonant clocking circuit, energy oscillates back and forth between inductive and capacitive circuit elements without a significant conductive or switching loss. More specifically, in the first circuit section, energy oscillates between inductor 402 and the load capacitance for output $\phi_{2L}$, which is lumped in with the gate capacitance for the opposing FET 408. Similarly, in the second circuit section, energy oscillates between inductor 404 and the load capacitance for output $\phi_{1L}$, which is lumped in with the gate capacitance for the opposing FET 410.

The top portion of FIG. 4 illustrates corresponding circuitry which generates outputs $\phi_{1H}$ and $\phi_{2H}$. The voltages on outputs $\phi_{1H}$ and $\phi_{2H}$ track the voltages on outputs $\phi_{1L}$ and $\phi_{2L}$, but are biased to be at higher voltage levels. This is accomplished by using two bootstrap capacitors, $C_{B1}$ 414 and $C_{B2}$ 412, and two cross-coupled FETs 422 and 420 that clamp the elevated clock output to $V_{LO}$ during one phase and then follow the clock output with a positive offset of $V_{LO}$ during the other phase. The elevated voltage levels on outputs $\phi_{1H}$ and $\phi_{2H}$ can be used to drive MOSFETs 202 and 204 which are illustrated in FIG. 2. As mentioned in the discussion above, these MOSFETs need gate drive signals that swing between $V_{LO}$ and $V_{HI}+V_G$. As is illustrated in the top portion of FIG. 4, the dotted line box A can be stacked again to provide the "extra-high" (XH) outputs of FIG. 2B.

Note that Zener diodes 418 and 416 (which, for example, can be 19V Zener diodes) are coupled between outputs $\phi_{1L}$ and $\phi_{2L}$, respectively, and ground to protect the circuit against large transient voltages during power up. Note also that transistors 420 and 422 could be replaced with ordinary diodes with an anode coupled to $V_{LO}$ and a cathode coupled to $\phi_{1H}$ or $\phi_{2H}$.

Minimizing Power Loss

Some embodiments of the present invention minimize the power loss in a switched-capacitor power converter by optimizing the gate drive voltage $V_G$ for a given output current $I_{RMS}$ and input voltage $V_{LO}$. As mentioned above, power losses in a switched-capacitor power converter include both (1) conduction losses through the switched-capacitor block (SCB) and (2) switching losses in the SCB and the resonant clocking circuit.

The conduction losses through the SCB are given by $I_{RMS}^2 R_O$, where $I_{RMS}$ is the root-mean-square output current and $R_O$ is the output resistance of the SCB. Note that the output resistance $R_O$ is dominated by the on-resistance $R_{ds(on)}$ of the switching FETs, where the larger the gate drive voltage $V_G$, the smaller the on-resistance.

There are two primary sources of switching loss in the switched-capacitor power converter. The first source occurs within the resonant clocking circuit from cycling the gates of the SCB FETs. The loss in the left-hand SCB FET gates in FIG. 2A is proportional to the gate voltage squared $V_G^2$. In contrast, the loss in the right-hand SCB FET gates is proportional to $(V_G-V_{LO})^2$, because the sources of the left-hand FETs are relative to the input voltage $V_{LO}$. Other switching losses are caused by the charging and discharging of the drain-to-source capacitance of the FETs. These other switching losses are proportional to $V_{LO}^2$.

Note that by increasing the gate drive $V_G$ the switching losses increase while the conduction losses decrease. Therefore, there is an optimal gate drive that minimizes the power loss for a given output current $I_{RMS}$ and input voltage $V_{LO}$.

Figure 5:
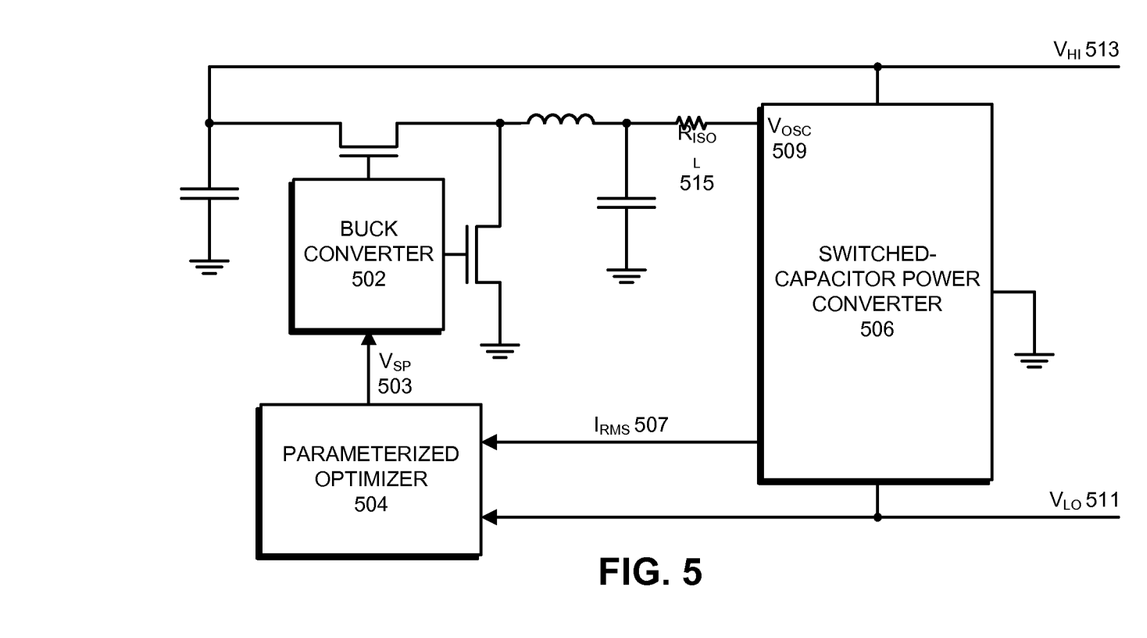
FIG. 5 illustrates a circuit that controls power loss for a switched-capacitor power converter in accordance with an embodiment of the present invention.

A good way to control $V_G$ is by controlling the resonant oscillator input voltage. For example, FIG. 5 presents a diagram of the parameterized optimizer circuit showing a buck converter 502 that controls the oscillator voltage $V_{OSC}$ 509 based on a calculated set point $V_{SP}$ 503 that is used by buck converter 502 to set the $V_{OSC}$ 509 level. The parameterized optimizer 504 calculates an optimal value of $V_{SP}$ 503 from measurements of $I_{RMS}$ 506 and $V_{LO}$ 511 to minimize the power loss in the switched-capacitor power converter 506, as shown in FIG. 5. Note that the amplitude $V_G$ is directly proportional to $V_{OSC}$ 509.

A buck converter or linear regulator can generate a controllable $V_{OSC}$ from the output of the switched-capacitor block $V_{HI}$ 513. The advantage of using a buck converter over a linear regulator is higher efficiency. Disadvantages of the buck converter include more parts, more board space, and higher cost. Moreover, a buck converter requires isolation between the buck's switching inductor and the resonant clocking circuit's inductors to prevent uncontrolled oscillations. One method for isolating the buck converter is to put a large output capacitance on the buck output separated from the input to the resonant oscillator by a small resistance $R_{ISOL}$ 515 as shown in FIG. 5.

One technique for minimizing the power loss begins by characterizing the total loss as a function of $V_{OSC}$, $I_{RMS}$, and $V_{LO}$ for the specific circuit design. The power loss can be measured in the lab by measuring the difference between the power in and the power out. With this data, the $V_{OSC}$ or $V_{SP}$ that minimizes the power for a given $I_{RMS}$ and $V_{LO}$ can be determined and parameterized. For instance, a simple parameterization is given by:

$$(V_{SP})_{opt}=K_A+K_B V_{LO}+K_C I_{RMS} \quad (1)$$

where the K terms are parameters determined from the measured losses.

The parameterized optimizer 504 in FIG. 5 then works by periodically (e.g., every second) measuring $V_{LO}$ and $I_{RMS}$, calculating the optimal set point $(V_{SP})_{opt}$ using Equation (1), wherein $V_{SP}$ controls $V_{OSC}$ via a buck controller. So as $V_{LO}$ and $I_{RMS}$ change, $V_{OSC}$ is periodically updated to minimize the loss in the switched-capacitor power converter.

Figure 6:
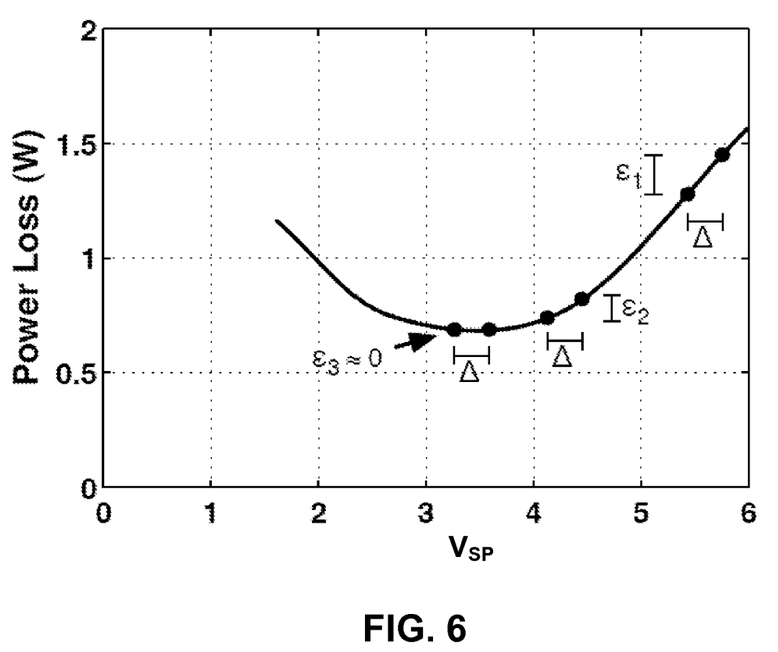
FIG. 6 presents a graph illustrating power loss as a function of gate drive voltage $V_G$ in accordance with an embodiment of the present invention.

Another technique for minimizing the power loss is to actively measure the power loss, $P_{Loss}=P_{IN}-P_{OUT}$, and implement a servo that minimizes this loss. The minimization servo, for instance, can in one period set $V_{SP}$ to some nominal value, and in the next period, set $V_{SP}$ to $V_{SP}+\Delta$, where $\Delta$ is a small perturbation. For example, FIG. 6 illustrates power loss measurements comprised of pairs of measurements separated by $\Delta$. More specifically, FIG. 6 illustrates power loss $P_{Loss}$ as a function of the oscillator set point $V_{SP}$ showing pairs of measurements separated by $\Delta$. Note that the power loss is at a minimum when the difference $\epsilon$ in power loss measurements is zero.

For each pair, a change in power loss $\epsilon$ can be measured as follows $$\epsilon=P_{Loss}(V_{SP})-P_{Loss}(VSP+\Delta) \quad (2)$$

The change in power loss $\epsilon$ is an error signal that feeds into the input of a PID servo that periodically adjusts the nominal set point $V_{SP}$ to control $\epsilon$ to zero. When $\epsilon$ is zero, then the switched-capacitor power converter will be operating at its minimum power loss. A standard proportional-integral-derivative (PID) servo can be used to minimize the power loss with tunable proportional, integral and derivative gains.

Figure 7:
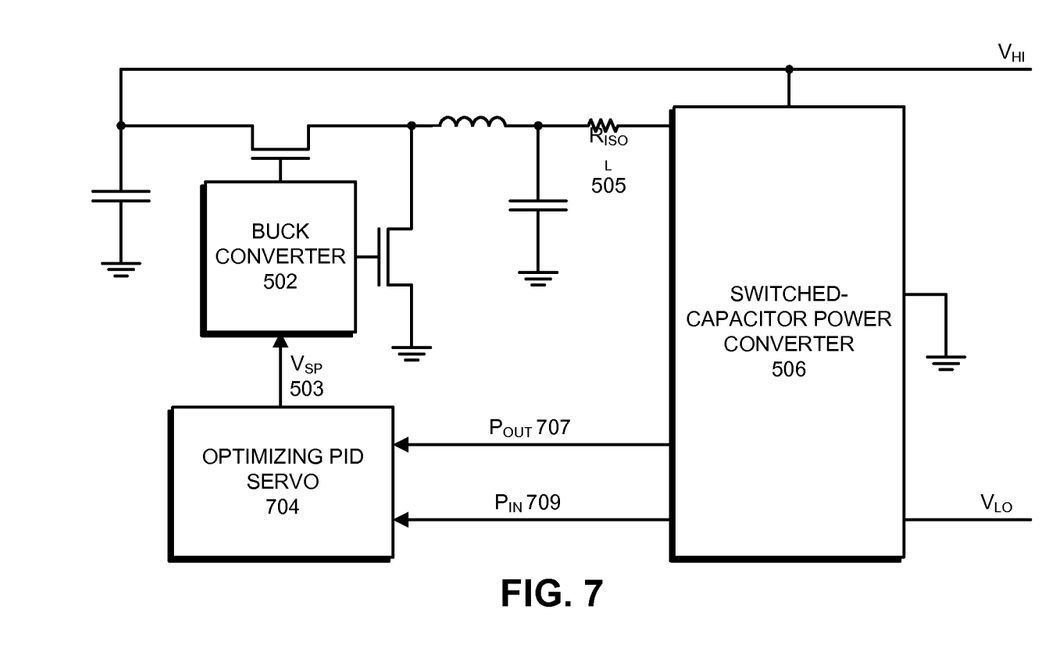
FIG. 7 illustrates an alternative circuit that controls power loss for a switched-capacitor power converter in accordance with an embodiment of the present invention.

FIG. 7 shows a diagram of an optimizer that implements a PID servo to minimize the power loss in the switched-capacitor power converter by controlling the set point to a buck controller that generates $V_{OSC}$. An advantage of the power-minimizing PID servo in FIG. 7 over the parameterized optimizer in FIG. 5 is that there is no requirement for pre-characterizing and parameterizing the switched-capacitor power converter. Also, there is no susceptibility to circuit-to-circuit variations or to the parameterization model. The disadvantage of this technique is the requirement of measuring the input RMS current $I_{RMS}$ to determine the input power, which depending on the needs of the circuit, can contribute significantly to the power loss.

As a compromise, a hybrid solution can be employed, where some characteristics are parameterized, such as the switching loss in drain-to-source capacitance of the SCB FETs, while others, such as the conductive losses and resonant oscillator losses, are directly measured. Such a hybrid implementation would work the same as the power-minimizing PID servo except that, rather than direct measurements of the power loss, the power loss would be estimated based on a combination of measurements and parameterization.

Other Mechanisms for Minimizing Power Loss

Instead of minimizing the power loss by controlling $V_{OSC}$, other implementations could, for instance, minimize power by changing the active number of parallel SCBs n or by adjusting the oscillator frequency $f_{OSC}$. To improve the conduction losses in the SCB, many SCBs can be connected in parallel, which reduces the conductive losses by a factor of n while increasing the switching losses by a factor of n. Hence, another possible implementation is to minimize power by enabling only the optimal number of SCBs for a given load current.

Also, adjusting $f_{OSC}$ is another effective way of minimizing power loss, because the switching loss in the oscillator increases with larger $f_{OSC}$ and the output resistance decreases with $f_{OSC}$. Note that the oscillator frequency $f_{OSC}$ is proportional to $1/\sqrt{LC}$, so by actively changing either the inductance of the oscillator L or the gate capacitance C of the SCB FETs, one can minimize the power loss.

The techniques of adjusting $V_{OSC}$, $f_{OSC}$, or the number of SCBs can all be used together to minimize overall power loss.

Benefits of Optimization

Figure 8A:
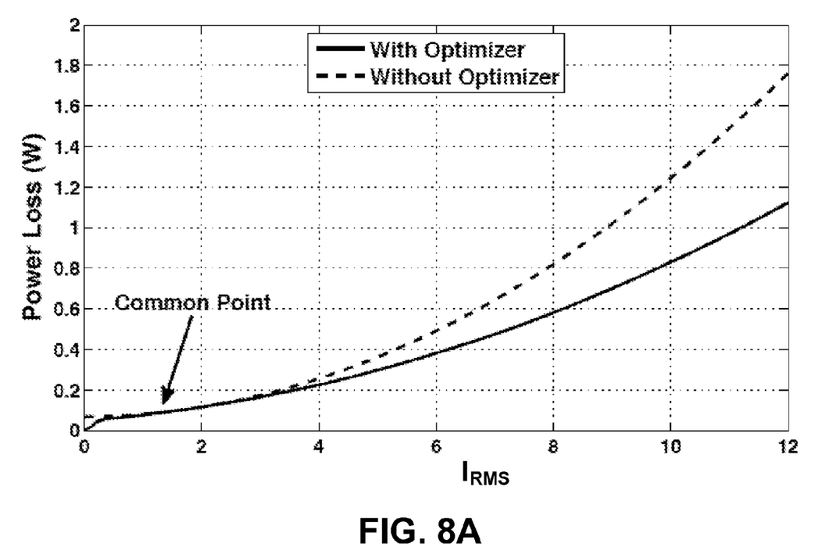
FIG. 8A presents a graph of power loss as a function of root-mean-square output current $I_{RMS}$ for both optimized and un-optimized power converters in accordance with the disclosed embodiments.
Figure 8B:
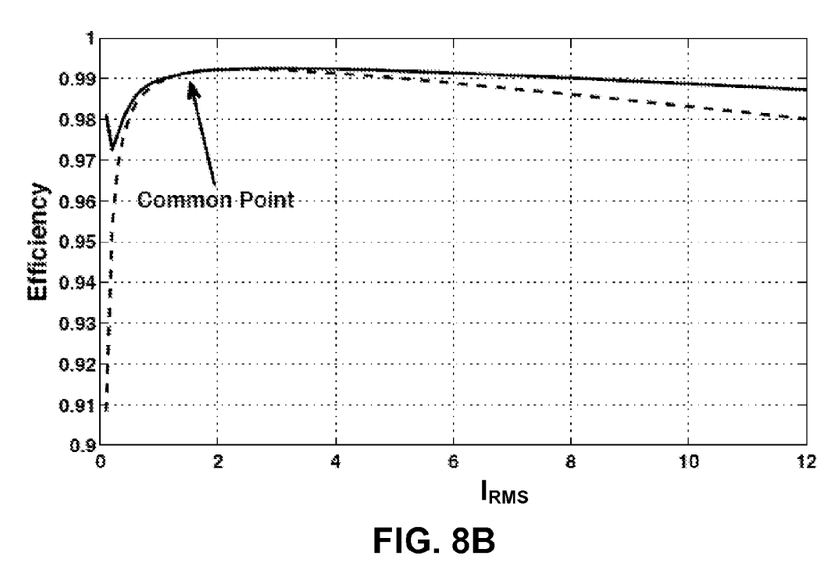
FIG. 8B presents a graph of power-conversion efficiency as a function of root-mean-square output current $I_{RMS}$ for both optimized and un-optimized power converters in accordance with the disclosed embodiments.

The benefits of using the optimizer can be seen in FIGS. 8A and 8B. More specifically, FIG. 8A illustrates power loss and FIG. 8B illustrates efficiency versus output current, both with the optimizer (solid lines) and without the optimizer (dashed lines). Note that the performance without the optimizer (fixed $V_{OSC}$) is optimized at the current indicated by the arrows.

The dashed lines in FIGS. 8A and 8B indicate the power loss and efficiency, respectively, for a switched-capacitor power converter using a fixed $V_{OSC}$ that is optimized for a specific $I_{RMS}$ and $V_{LO}$. In contrast, the solid lines show the power loss and efficiency improvement gains from using the optimizers.

At very high output currents, the optimizer increases $V_{OSC}$, thereby reducing $R_O$ and the conduction losses, which outweigh the increased switching losses. In contrast, at very light loads, the optimizer reduces $V_{OSC}$, causing $R_O$ and the conduction losses to increase, but significantly reducing the switching losses.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for actively controlling a power loss in a switched-capacitor power converter, the method comprising:
   operating the switched-capacitor power converter, wherein the switched-capacitor power converter includes one or more switched-capacitor blocks (SCBs) and a clocking circuit which produces gate drive signals for switching transistors in the one or more SCBs; and
   while the switched-capacitor power converter is operating, actively controlling the gate drive signals from the clocking circuit to substantially minimize the power loss for the switched-capacitor power converter;
   wherein actively controlling the gate drive signals involves controlling a voltage of the gate drive signals; and
   wherein controlling the voltage of the gate drive signals involves, measuring a power loss for the switched-capacitor power converter, and using the measured power loss as an input to a control system which controls the voltage of the gate drive signals to substantially minimize the power loss for the switched-capacitor power converter.

2. The method of claim 1,
   wherein the one or more SCBs include multiple SCBs; and
   wherein actively controlling the gate drive signals also involves controlling how many SCBs the gate drive signals are driving, wherein increasing the number of SCBs decreases conduction losses in the SCBs but increases switching losses in the one or more SCBs and the clocking circuit, and wherein decreasing the number of SCBs decreases switching losses in the one or more SCBs and the clocking circuit but increases conduction losses in the SCBs.

3. The method of claim 1, wherein controlling the voltage of the gate drive signals involves:
   determining a voltage for the gate drive signals as a function of an input voltage and an output current for the switched-capacitor power converter, wherein the function uses predetermined parameters; and
   using the determined voltage to produce the gate drive signals.

4. The method of claim 1, wherein the control system uses a proportional-integral-derivative (PID) control technique to control the voltage of the gate drive signals.

5. The method of claim 1, wherein controlling the voltage of the gate drive signals involves:
   performing power measurements to produce one or more measured components of the power loss;
   using a parameterization model to calculate one or more parameterized components of the power loss based on one or more measured inputs and one or more parameters;
   estimating the power loss for the switched-capacitor power converter based on the measured components and the parameterized components; and
   using the estimated power loss as an input to a control system which controls the voltage of the gate drive signals to substantially minimize the power loss for the switched-capacitor power converter.

6. The method of claim 1, wherein the clocking circuit is a resonant oscillator circuit which includes at least one inductance and at least one capacitance.

7. A method for actively controlling a power loss in a switched-capacitor power converter, the method comprising:
   operating the switched-capacitor power converter, wherein the switched-capacitor power converter includes one or more switched-capacitor blocks (SCBs) and a clocking circuit which produces gate drive signals for switching transistors in the one or more SCBs; and
   while the switched-capacitor power converter is operating, actively controlling the gate drive signals from the clocking circuit to substantially minimize the power loss for the switched-capacitor power converter;
   wherein actively controlling the gate drive signals involves using one or more tapped inductors in the clocking circuit to a frequency of the gate drive signals.

8. A switched-capacitor power converter configured to actively control a power loss involved in converting an input voltage to an output voltage, comprising:
   one or more switched-capacitor blocks (SCBs), wherein each SCB includes a first capacitor and a set of switching devices configured to couple a constant-potential terminal and a time-varying-potential terminal of the first capacitor between the input voltage, the output voltage and a reference voltage;
   a clocking circuit which produces gate drive signals for switching transistors in the one or more SCBs; and
   a controller configured to actively control the gate drive signals from the clocking circuit to substantially minimize the power loss for the switched-capacitor power converter;
   wherein the controller is configured to actively control the gate drive signals by controlling a voltage of the gate drive signals;
   wherein while controlling the voltage of the gate drive signals, the controller is configured to, measure a power loss for the switched-capacitor power converter, and use the measured power loss as an input to a control system which controls the voltage of the gate drive signals to substantially minimize the power loss for the switched-capacitor power converter.

9. The switched-capacitor power converter of claim 8,
   wherein the one or more SCBs include multiple SCBs; and
   wherein the controller is configured to actively control the gate drive signals by also controlling how many SCBs the gate drive signals are driving, wherein increasing the number of SCBs decreases conduction losses in the SCBs but increases switching losses in the one or more SCBs and the clocking circuit, and wherein decreasing the number of SCBs decreases switching losses in the one or more SCBs and the clocking circuit but increases conduction losses in the SCBs.

10. The switched-capacitor power converter of claim 8, wherein while controlling the voltage of the gate drive signals, the controller is configured to:
   determine a voltage for the gate drive signals as a function of an input voltage and an output current for the switched-capacitor power converter, wherein the function uses predetermined parameters; and
   use the determined voltage to produce the gate drive signals.

11. The switched-capacitor power converter of claim 8, wherein the control system uses a proportional-integral-derivative (PID) control technique to control the voltage of the gate drive signals.

12. The switched-capacitor power converter of claim 8, wherein while controlling the voltage of the gate drive signals, the controller is configured to:
perform power measurements to produce one or more measured components of the power loss;
use a parameterization model to calculate one or more parameterized components of the power loss based on one or more measured inputs and one or more parameters;
estimate the power loss for the switched-capacitor power converter based on the measured components and the parameterized components; and
use the estimated power loss as an input to a control system which controls the voltage of the gate drive signals to substantially minimize the power loss for the switched-capacitor power converter.

13. The switched-capacitor power converter of claim 8, wherein the clocking circuit is a resonant oscillator circuit which includes at least one inductance and at least one capacitance.

14. A switched-capacitor power converter configured to actively control a power loss involved in converting an input voltage to an output voltage, comprising:
one or more switched-capacitor blocks (SCBs), wherein each SCB includes a first capacitor and a set of switching devices configured to couple a constant-potential terminal and a time-varying-potential terminal of the first capacitor between the input voltage, the output voltage and a reference voltage;
a clocking circuit which produces gate drive signals for switching transistors in the one or more SCBs; and
a controller configured to actively control the gate drive signals from the clocking circuit to substantially minimize the power loss for the switched-capacitor power converter;
wherein the controller is configured to actively control the gate drive signals by using one or more tapped inductors in the clocking circuit to control a frequency of the gate drive signals, wherein increasing the frequency of the gate drive signals decreases conduction losses in the one or more SCBs but increases switching losses in the one or more SCBs and the clocking circuit, and wherein decreasing the frequency of the gate drive signals decreases switching losses in the one or more SCBs and the clocking circuit but increases conduction losses in the one or more SCBs.

15. A power supply, comprising:
a battery that provides an input voltage;
an output that provides an output voltage; and
a switched-capacitor power converter configured to actively control a power loss while converting the input voltage to the output voltage, wherein the switched-capacitor power converter comprises,
one or more switched-capacitor blocks (SCBs), wherein each SCB includes a first capacitor and a set of switching devices configured to couple a constant-potential terminal and a time-varying-potential terminal of the first capacitor between the input voltage, the output voltage and a reference voltage;
a clocking circuit which produces gate drive signals for switching transistors in the one or more SCBs; and
a controller configured to actively control the gate drive signals from the clocking circuit to substantially minimize the power loss for the switched-capacitor power converter;
wherein the controller is configured to actively control the gate drive signals by controlling a voltage of the gate drive signals; and
wherein while controlling the voltage of the gate drive signals, the controller is configured to, measure a power loss for the switched-capacitor power converter, and use the measured power loss as an input to a control system which controls the voltage of the gate drive signals to substantially minimize the power loss for the switched-capacitor power converter.

16. The power supply of claim 15, wherein the one or more SCBs include multiple SCBs; and wherein the controller is also configured to actively control the gate drive signals by controlling how many SCBs the gate drive signals are driving.

\* \* \* \* \*